US012248912B2

(12) United States Patent
Hageman et al.

(10) Patent No.: US 12,248,912 B2
(45) Date of Patent: Mar. 11, 2025

(54) METHOD OF RECIRCLING AND ASSOCIATED COMPUTER PROGRAM

(71) Applicant: MILGRO GROEP B.V., Rotterdam (NL)

(72) Inventors: Ruud Hageman, Rotterdam (NL); Laurens Maurice Groen, Rotterdam (NL)

(73) Assignee: MILGRO GROEP B.V., Rotterdam (NL)

( * ) Notice: Subject to any disclaimer, the term of this patent is extended or adjusted under 35 U.S.C. 154(b) by 631 days.

(21) Appl. No.: 17/282,985

(22) PCT Filed: Sep. 26, 2019

(86) PCT No.: PCT/NL2019/050650
§ 371 (c)(1),
(2) Date: Apr. 5, 2021

(87) PCT Pub. No.: WO2020/067899
PCT Pub. Date: Apr. 2, 2020

(65) Prior Publication Data
US 2021/0342795 A1 Nov. 4, 2021

(30) Foreign Application Priority Data
Sep. 28, 2018 (NL) .................................. 2021726

(51) Int. Cl.
*G06Q 10/30* (2023.01)
*G06Q 10/04* (2023.01)

(52) U.S. Cl.
CPC ............ *G06Q 10/30* (2013.01); *G06Q 10/04* (2013.01)

(58) Field of Classification Search
None
See application file for complete search history.

(56) References Cited

U.S. PATENT DOCUMENTS

| 5,184,780 | A | * | 2/1993 | Wiens | C05F 9/02 241/DIG. 38 |
| 6,117,671 | A | * | 9/2000 | Yilmaz | B65F 3/001 71/10 |
| 10,688,544 | B2 | * | 6/2020 | Gitschel | B09B 3/00 |
| 2007/0039879 | A1 | | 2/2007 | Nunn et al. | |
| 2008/0290006 | A1 | * | 11/2008 | Duffy | B03B 9/062 209/630 |
| 2011/0000402 | A1 | * | 1/2011 | Grasso, Jr. | C04B 28/04 106/713 |
| 2017/0253891 | A1 | * | 9/2017 | Gitschel | B03B 9/06 |
| 2021/0390518 | A1 | * | 12/2021 | Cochrane | B07C 5/344 |

FOREIGN PATENT DOCUMENTS

| EP | 2244223 A1 | 10/2010 |
| WO | 03107103 A1 | 12/2003 |
| WO | 2009158486 A1 | 12/2009 |

* cited by examiner

*Primary Examiner* — Jan P Mincarelli
(74) *Attorney, Agent, or Firm* — AEON Law, PLLC; Adam L. K. Philipp; Charlotte E. Holoubek

(57) ABSTRACT

The present invention is in the field of a method of recircling a multitude of generic waste streams. Although many efforts are in place to recycle waste streams, typically these efforts are limited in effect. Not only is a significant part of the waste streams burned, but most of the waste, if recycled, is reduced in quality and therefore only applicable in lower value production of goods.

20 Claims, 4 Drawing Sheets

METHOD OF RECIRCLING AND ASSOCIATED COMPUTER PROGRAM

RELATED APPLICATIONS

This application is a U.S. National Phase of, and claims priority to, PCT International Phase Application No. PCT/NL2019/050650, filed Sep. 26, 2019, which claims priority to Netherlands Patent Application No. NL2021726, filed Sep. 28, 2018. The entire contents of the above-referenced applications and of all priority documents referenced in the Application Data Sheet filed herewith are hereby incorporated by reference for all purposes.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

FIELD OF THE INVENTION

The present invention is in the field of a method of recircling a multitude of generic waste streams. Although many efforts are in place to recycle waste streams, typically these efforts are limited in effect. Not only is a significant part of the waste streams burned, but most of the waste, if recycled, is reduced in quality and therefore only applicable in lower value production of goods, also referred to as down-cycling.

BACKGROUND OF THE INVENTION

The present invention is in the field of a method of recircling a multitude of generic waste streams.

Recycling is considered as a process of converting waste materials, typically originating from physical objects as goods, into new materials and objects. It is a good alternative to simply disposing of waste. In principle it helps to save material, and therefore also contributes to lowering greenhouse gas emissions. Recycling is aimed at preventing waste of useful materials; it thereby reduces use of new raw materials.

In general practice of waste reduction involves reducing use of natural resources/raw material, reusing at least parts of products, preferably products, and the above recycling. In fact, to some extent, practices are formalized, such as in ISO 15270:2008 for plastics waste and ISO 14001:2004 for environmental management control of recycling practice. Despite implementation of formal procedures, it has been found that in practice it is cumbersome, if not practically impossible, to have sufficient insight in production processes and product composition to significantly reduce use of natural resources/raw material, let alone reuse at least parts of products; in addition recycling it typically limited to low grade reuse or incarnation, and often waste disposal. In practice waste reduction is limited to partly recycling waste and disposing the rest.

Recyclable materials may include a large variety with varying quantities, often depending on government regulations and practices per country, such as glass, paper, cardboard, metals, plastics, tires, textiles, and domestic appliances such as refrigerators, television's, and further electronics, biodegradable waste, such as of food and from a garden. Most of the above to be recycled materials are collected and transported to a facility, then typically only a fraction is sorted, an even smaller fraction is cleaned, and a minor fraction is reprocessed into new, but typically lower grade, materials. In a rough estimate about 5-10% of waste material is actually reused, some waste streams (such as paper) may have >80% reuse, but most waste streams are effectively discarded of.

In an example recycling of a given material would produce a fresh supply of the same material. A good example thereof is used paper that can be converted into new office paper of typically slightly lower quality (being a little greyish) or used polystyrene foam into new polystyrene. There are severe limitations however, as it is generally too difficult and often not economical (too expensive). In an alternative recycling may involve reuse in different materials instead. Another form of recycling is the salvage of certain materials from complex products, sometimes driven by government regulations, e.g. in view of intrinsic value, or in view of hazardous nature.

The perspective of the objective of recycling is typically limited to a single product or group of similar products, such as organic waste. Also in no way the present practice is sustainable over longer periods of time, such as even the next few decades. One may argue that welfare has been increased over recent times, but at the expense or with the misbalance of well-being, e.g. pollution, emissions, health, etc.

Some documents recite basic principles of recycling; this typically relates to a single product and partial reuse of material, at the best. WO 2009/158486 A1 recites an integrated bunker storage systems for waste streams based on the composition and characteristics of waste streams. In particular, for producing a desired output from a chemical conversion process, e.g., gasification, hence destruction of the material. US 2007/039879 A1 recites a method for sustainable product solution development including endorsing the waste stream supply; engaging the endorsed waste stream supply in order to identify sustainable product targets; sourcing the sustainable product targets into sustainable product solutions and maintaining the sustainable product solutions. The method is used for generating reports and educating a waste provider. US 2017/253891 A1 recites a method for processing mixed solid waste that includes a mixture of wet organic material and dry organic material that can be are separated using mechanical separation to produce a wet organic stream enriched in wet organics and a dry organic stream enriched in dry organics. The separated wet organic stream and dry organic stream are separately converted to renewable or recyclable products using different conversion techniques particularly suited for the separated wet and dry organic streams. EP 2 244 223 A1 recites a dynamic sustainability factor management system that can facilitate scoring of sustainability factors associated with an industrial environment is provide. This relates to a model largely. WO 03/107103 A1 recites a process is modeled by a dynamic model, handling time dependent relations between manipulated variables of different process sections (10A-D) and measured process output variables. This document does not seem to relate to recycling, let alone recircling.

There is therefore a need for improved method of recircling. It is an object of the present invention to provide a method of recircling which overcomes one or more of the above disadvantages without jeopardizing functionality and advantages.

SUMMARY OF THE INVENTION

The present invention relates to method of recircling a multitude of generic waste streams, comprising recycling, reducing, and reusing, amongst others by separating the waste streams into sub-components, and controlling both the input waste streams and the output streams in advance and during the process in terms of time (t), quantity (q), quantity/time (q/t), emission (e), energy use (E), costs (€), such as production costs, transportation costs, labor costs, waste costs, and quality (Q), of both the waste streams and of the product paths, and a number of reuse paths. Control is in one aspect achieved by digitizing, such as by implementing on a computer, which is rather complex without the present method. The present method is aimed at optimizing recircling of all multiple streams, inputs etc., together, in view of the parameters given; so if for instance in the total system total emissions would increase then the total system is optimized by e.g. changing re-use paths in order to reduce emissions. After identifying and determining (that is establishing) an initial situation the structure of streams may be determined and codified. For each component a return path is determined and organized, at minimal costs, energy usage, emission, and losses. Ecology and economy are harmonized. The present input streams may be a chain of streams, such as from a manufacturer, to a distributor, to a shop, before an output stream is generated at a shop, as well as a combination of input streams. The present method may be regarded as a multi-chain and interwoven chain waste to product process which is typically optimised continuously in view of changing input and changing output streams. Such is very different from prior art recycling, as indicated above. In the present method typically huge amounts (at least many tonnes) of generic waste streams are involved. The present method combines a multitude of said waste streams, typically a few hundred or more. These waste streams originate from a plurality of sources, from at least a few to a few hundred or more. Examples of waste streams are organic waste, plastic, foils, glass, cardboard, paper, metals, wood, accumulators, batteries, oil, environmentally dangerous waste, chemical waste, as well as complete products, as cars, such as electrical cars, appliances, such as refrigerators, washing machines, etc. Examples of output streams are reusable elements, such as batteries, cooling liquid, oil, separated metal, paper, sorted glass, etc. A first step of the method is in taking the multitude of waste streams. In view of controlling the output stream the waste streams are qualified and quantified. In addition potential paths of recircling are identified, as well as quantities, qualities, variation therein over time, etc. The method further involves separating separable sub-components of the multitude of generic waste streams from one and another, in so far as possible. For these sub-components waste streams ($SCW_j$) are provided. Clearly sub-components have a chemical, physical, or biological nature, or a combination thereof, such as plastic, foils, glass, cardboard, paper, metals, and appliances, batteries, etc. These (either generic of subcomponent) waste streams are than in put in a distribution station, typically into more than one distribution station. These distribution stations may be regarded as a roundabout for input material intake and material output. For some waste streams the distribution station may be skipped, whereas for others the distribution station and a re-use path may be one and the same, i.e. a stream or part thereof may be provided directly as an output stream to at least one product path. Then at least one re-use path ($RU_k$) per distribution station ($RA_n$) is provided, that is potential and actual routes of re-using, as well as characteristics thereof are provided. The re-use path optionally is an end of life path, which is considered unfortunate and less preferred. Then at least one re-use path ($RU_k$) per sub-component (or likewise generic) waste stream ($SCW_j$) is selected. The multitude of sub-component waste streams and generic waste streams is transferred to a number of re-use paths while controlling (C) at least one of time (t), quantity (q), quantity/time (q/t), emission (e), energy use (E), costs (€), quality (Q) of the waste streams, and a number of reuse paths. The control can amongst others be for optimizing output, minimizing losses, increasing value, etc. The control can be visualized, such as by using a dashboard indicating amounts, flow, quality, of various streams or sub-streams. Then at least one output stream ($OS_p$) is generated, or if it already exists, reused, each output stream receiving input from at least one re-use path ($RU_k$). The at least one output stream ($OS_p$) Is transferred to a number of product paths ($PP_s$) while controlling (C) at least one of time (t), quantity (q), quantity/time (q/t), emission (e), energy use (E), costs (€), quality (Q) of the product paths, and a number of product paths. As such, each and any sub-component and generic waste can be re-used in a new product. The new product may be different from where the waste streams originate, may be the same, may be a lower grade product, may relate to a refurbishment, and combinations thereof. The complexity of present producing societies in terms of variety of products and waste streams, varying quantities (typically over time) and qualities, limited re-use options, separation issues, etc. makes the present method still a challenge. About 80% of a total of the multitude of waste streams can be recircled, clearly varying from waste stream to waste stream. Optimization can also be achieved by (partly) redirecting waste streams, e.g. from one re-use path to another. Also changing a quality of e.g. packaging may help, such as increasing the quality of cardboard and therewith allowing the cardboard to be recircled more often; this may be very relevant as in terms of logistics it is complicated to have suited packaging available at the right time in the right quantities at the right location, e.g. in terms of varying sizes of packages typically required. Logistics may also be improved by increasing a fill grade of transportation units, e.g. from 40% fill grade to about 100%. Such can be done on a unit basis. In general the present method and changing and optimizing the present method has a significant impact on the environment as well as on financial aspects. It is noted that large variations over time typically exist. Such makes forecasting inherently difficult, whereas for continuous production good forecasting is rather essential. The present method provides a significant reduction in losses, especially in terms of money. The present method provides for each input stream and for each output stream an option of identifying losses, costs involved, gains, such as for/during transport. Now a re-iteration of the method steps can be performed until a sum of losses reaches a minimum, clearly within a certain accuracy. Although the present steps may be considered rather trivial, this is not the case in practice. The present method provides a reliable process for recircling waste streams, in terms of at least quantity, quality, emission (e), energy use (E), costs (€), and flow (quantity/time) over time. It is a surprise that hardly any usable knowledge exists with e.g. producers and sellers on product composition, sub-components.

The present method and system is also flexible and versatile. For instance, when a novel method of separating components becomes available the waste streams can be redirected towards such a novel method.

In summary one may conclude that consumers are motivated to consumer more and more, at minimal production costs, but at the expense of the planet, further costs, such as for removing waste, at the expensive of health, such as pollution, and in the end at the expense of total costs. Typically, production and use processes may be considered singular, form production to waste. Waste is produced in the production process, during transportation, at retail, at the consumer location, and so on, and finally the product is typically discarded, hopefully at an end of life situation. One of the issues is that the return route of the product is not provided for. The present method distinguishes over the prior art amongst others that true recycling, hence recircling, is provided.

Thereby the present invention provides a solution to one or more of the above-mentioned problems.

Advantages of the present description are detailed throughout the description. The teachings and examples of the present invention may be combined into a further not specifically disclosed exemplary embodiment.

DETAILED DESCRIPTION OF THE INVENTION

In a first aspect the invention relates to a method of recircling a multitude ($\geq 2$), typically >100, such as >1000, of generic waste streams from a plurality ($\geq 2$), typically >100, such as >1000, of sources according to claim 1.

In an exemplary embodiment of the present method after in taking a waste stream the waste stream is pretreated with a primary treatment unit, such as by compressing. Therewith a volume of the waste stream, a quality of the waste stream, a quantity of the waste stream, and combinations thereof, can be optimized, such as leading to a reduction in transportation movements, increasing a quantity of to be reused waste, etc.

In an exemplary embodiment of the present method the multitude of sub-components and waste streams are transferred over a period of at least one week to the plurality of re-use paths, preferably at least one year, such as five years. Therewith a more or less continuous transfer is achieved, which may involve variations over time, such as in quantity and quality.

In an exemplary embodiment of the present method a quantity is at least 1000 kg, and or wherein quantity/time is at least 1000 kg/week. However, the quantities are most often much larger, such as one hundred to thousands of tons, per week.

In an exemplary embodiment of the present method at least one waste stream is reduced in size preferably by minimizing input of to a product further or foreign streams. Once having identified the various waste streams it is preferred to reduce an overall input all together, such as by reducing waste streams. In principle an effort is put in to reduce all waste streams in size.

In an exemplary embodiment of the present method the transfer of the quantity and/or quantity/time of at least one waste stream is optimized by reducing a number of transfers. Such may be the case when a re-use path is identified; the input stream can be regarded as output stream, and at least part thereof can be directed directly to a product path. For instance, surplus vegetables are often disposed of, but can be used directly such as for storage stable products, or animal food, etc. In such cases the waste stream of surplus vegetable is transferred directly for re-sue, without any intermediate step.

In an exemplary embodiment of the present method at least one quantity of the multitude ($\geq 2$) of generic waste streams is reduced, as detailed above.

In an exemplary embodiment of the present method at least one waste stream relates to a product, and wherein at least one re-use path provides input to a production of said product. Such a re-use may be regarded as fully circular.

In an exemplary embodiment of the present method at least one waste stream relates to a product, wherein the quality of the at least one product and/or package thereof is changed, for instance when it is considered that an alternative can be re-used and/or when an alternative alleviates problems with separation or reuse, such as due to incompatibilities, and wherein the waste stream is redirected to a different re-use path, for instance when a more optimal re-use path is found, such as in terms of quantity, quality, and/or a different product path, preferably a circular re-use path. The present method allows for continuous optimization. For instance, when changes in the waste streams occur, or in re-use paths, or in product path, or in available technology, the method can be optimized again. The method is therefore very flexible.

In an exemplary embodiment of the present method at least one waste stream enters a distribution station (RAn), and wherein at least one re-use path exits said distribution station (RAn), and wherein at least one reuse path exiting a first distribution station (RAn) enters a second distribution station (RAn). By having a flexible system, waste streams can be entered into a distribution station directly, or via another distribution station. Therewith, e.g. in view of quantities, waste streams can be controlled easily.

In an exemplary embodiment of the present method at least one waste stream and/or at least one re-use path, or part thereof, is redirected from a first distribution station (RAn) to a second distribution station (RAn). During the present method also redirections may be implemented, such as to optimize reuse.

In an exemplary embodiment of the present method at least one of time (t), quantity (q), quantity/time (q/t), emission (e), energy use (E), costs (€), quality (Q), and a number of sub-component waste streams (SCWj) are controlled. By having an overview in principle for any given situation, e.g. in terms of number of waste streams, characteristics thereof, etc. control can be established.

In an exemplary embodiment of the present method a quantity and/or a quantity/time of at one least sub-component waste streams (SCWj) is reduced. Re-use of material is clearly an important goal that is achieved with the present method. In addition, also various reductions may be implemented.

In an exemplary embodiment of the present method a number of sub-component waste streams (SCWj) per product is increased, or put different thereby reducing losses. It is an object of the present invention to have minimal (overall) losses and maximum reuse.

In an exemplary embodiment of the present method a number of product paths (PPs) per output stream (OSp) is increased. Such is rather complicated as for instance reuse paths do not come into the picture yet. So further paths need to be provided. An ultimate goal is to have industrial symbiosis between at least a few waste streams and product paths, but preferably to reduce losses to a minimum, of say less than 1%, and reuse the remainder of the material. It is noted that typical processes at the best reuse 8-9%, hence have a loss of >90%.

In an exemplary embodiment of the present method at least one of quantity and quality of at least one sub-component waste stream (SCWj) is changed. This may for instance be the case when more value and/or more reuse can be created.

In an exemplary embodiment of the present method control involves of at least one re-use path (RUk) forecasting at least one of time (t), quantity (q), quantity/time (q/t), emission (e), energy use (E), costs (€), quality (Q), and a number of reuse paths, and/or wherein control involves of at least one product paths (PPs) forecasting at least one of time (t), quantity (q), quantity/time (q/t), emission (e), energy use (E), costs (€), quality (Q), and a number of product paths (PPs). In view of production processes, a good control is clearly preferred. Forecasting is an important aspect therein. Examples of forecasting are forecasting released flows from the automotive sector (inter alia under the influence of the season, weather/climate, regular maintenance patterns), such as of batteries, tires, and oil thereof. Given the increasing electrification of the fleet, the present method also predicts the impact of this on the maintenance demand—and therefore on the flows released. Also forecasting of flows of excessive organic material (such as of flowers, vegetable, fruit); partly under the influence of inter alia seasonal patterns, weather/climate and holidays (e.g. Valentine's Day→supply and rotation of roses). Also forecast of supply chain flows (such as packaging flows such as foil and cardboard), under the influence of, among other things, predicted market growth, seasonal patterns and public holidays (Sinterklaas).

In an exemplary embodiment of the present method at least one sub-component waste streams (SCWj) is treated such that it "is as good as new". An example thereof are re-furbished batteries. The sub-components can therewith be used in the same way as comparable new sub-components.

In an exemplary embodiment of the present method at least one feedback loop is created. The feedback loop may be internal in a process of recircling (intra), may be between processes of recircling (inter), or both. The feedback may relate to benchmarking performances of one party in view of other parties, and improving the performance of the one party. The feedback may involve redesign of a process; e.g. certain process steps are removed or replaced, therewith reducing costs, such as labor costs, and reducing waste. In addition, process steps that were absent may be introduced, such as in a case were a product considered to be waste could easily be reused after a simple pretreatment step. As such a process can be optimized and effects of such optimization directly effects waste streams, which can be monitored and controlled.

In an exemplary embodiment of the present method the method is implemented on a computer and preferably wherein control is on the computer. The computer may be physical, may be a cloud computer, may be on a server, etc. The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

DETAILED DESCRIPTION OF THE FIGURES

Figure 1A:
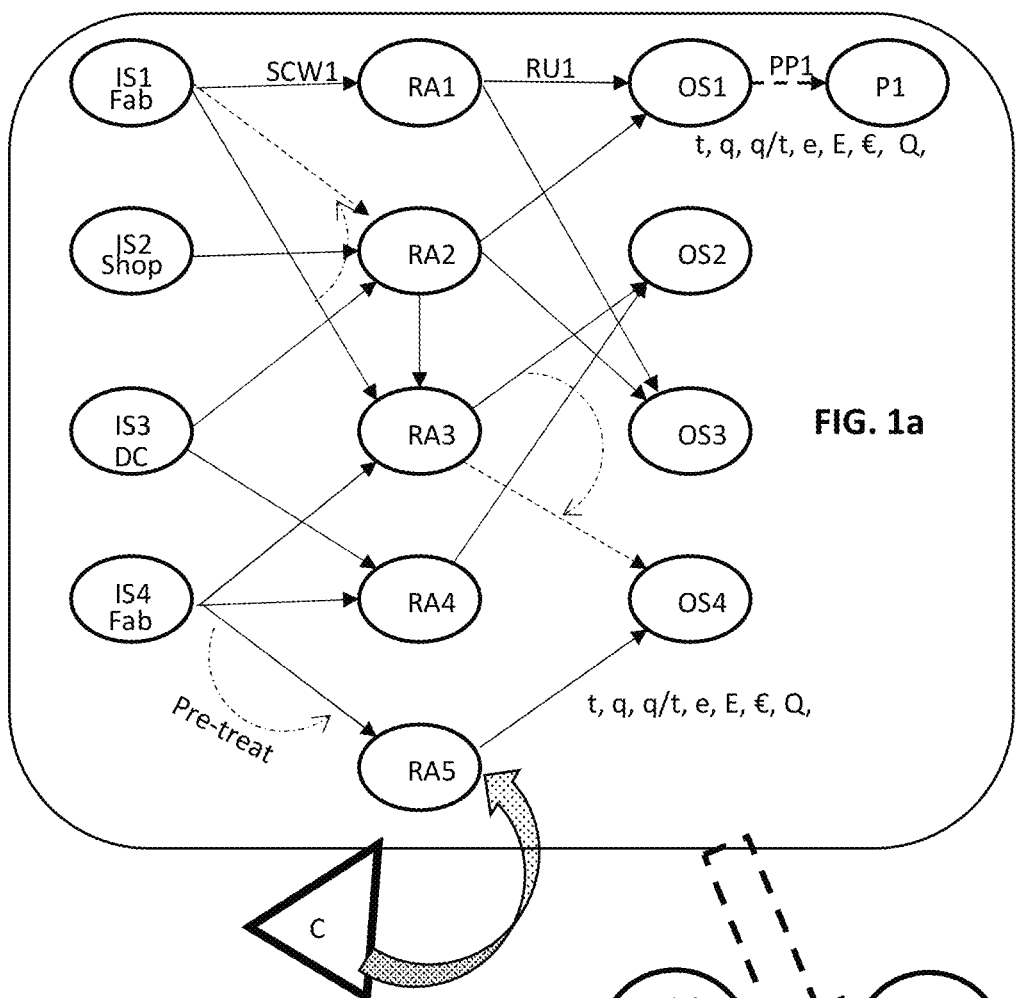
FIGS. 1a-d show schematically method steps.

FIGS. 1a-d show schematically method steps. In FIG. 1a on a left side various input streams ISi are given. Of each stream sub-components $SCW_1$ are separated from one and another. The waste streams are directed towards a distribution station $RA_i$. Then streams are directed to another distribution station, or to a reuse path $RU_j$. As such an output stream $OS_i$ is created. One output path may receive input from more than one distribution station. Also, a reuse path may be redirected from a given distribution station to another output stream. The output stream is directed to a product path I, and finally a product P1 is formed. The whole process flow is controlled by a controller.

Figure 1B:
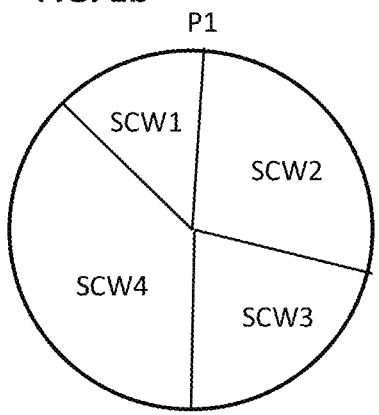

FIG. 1b shows schematically that a product P1 may comprise various sub-components $SCW_i$, leading to sub-component waste streams. It has been found relatively complex to identify at least a significant portion of the waste streams of a given product, despite expectations otherwise. Identifying all or almost all of the sub-components typically requires a full study of the components, but nevertheless has been achieved by the applicant for many products already.

Figure 1C:
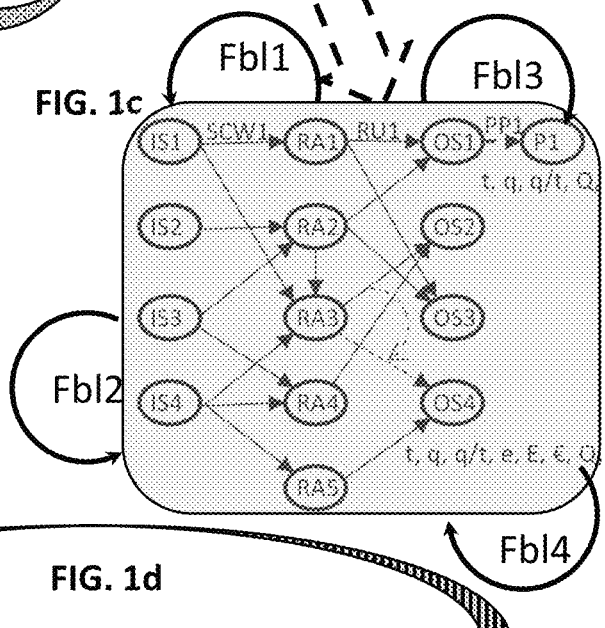

FIG. 1c shows various feedback loops. A first feedback loop may be directed to a producer, providing information on quantities of sub-components that can be reused. For instance, a plastic producer may be advised to reduce an amount of filler, such as chalk, as the amount of filler prevents recycling of the plastic. A second feedback loop may be directed towards a purchasing department, informing that the purchased item may be cheap, but causes increased emissions further up in the recircling, and is therefore not preferred. A third feedback loop may be directed towards a packaging company, informing them that other means of packaging may reduce costs as the package may be reused; for instance, upgrading quality of crates makes these reusable and therewith reduce costs per time the crate is used. In a fourth feedback loop a recycler may be informed that a method of recycling could be changed by separating more sub-components, such that overall losses are reduced. In a further feedback loop a supplier of beverages was advised to replace the colored package material by a transparent similar package material, as all other package materials at the site of the distributor were transparent, and could otherwise not be reused without the expensive of labor intensive separation.

Figure 1D:

FIG. 1d shows a fully circular method. In the control of the process flow some material may be lost, indicated by arrows that become smaller.

Figure 2:
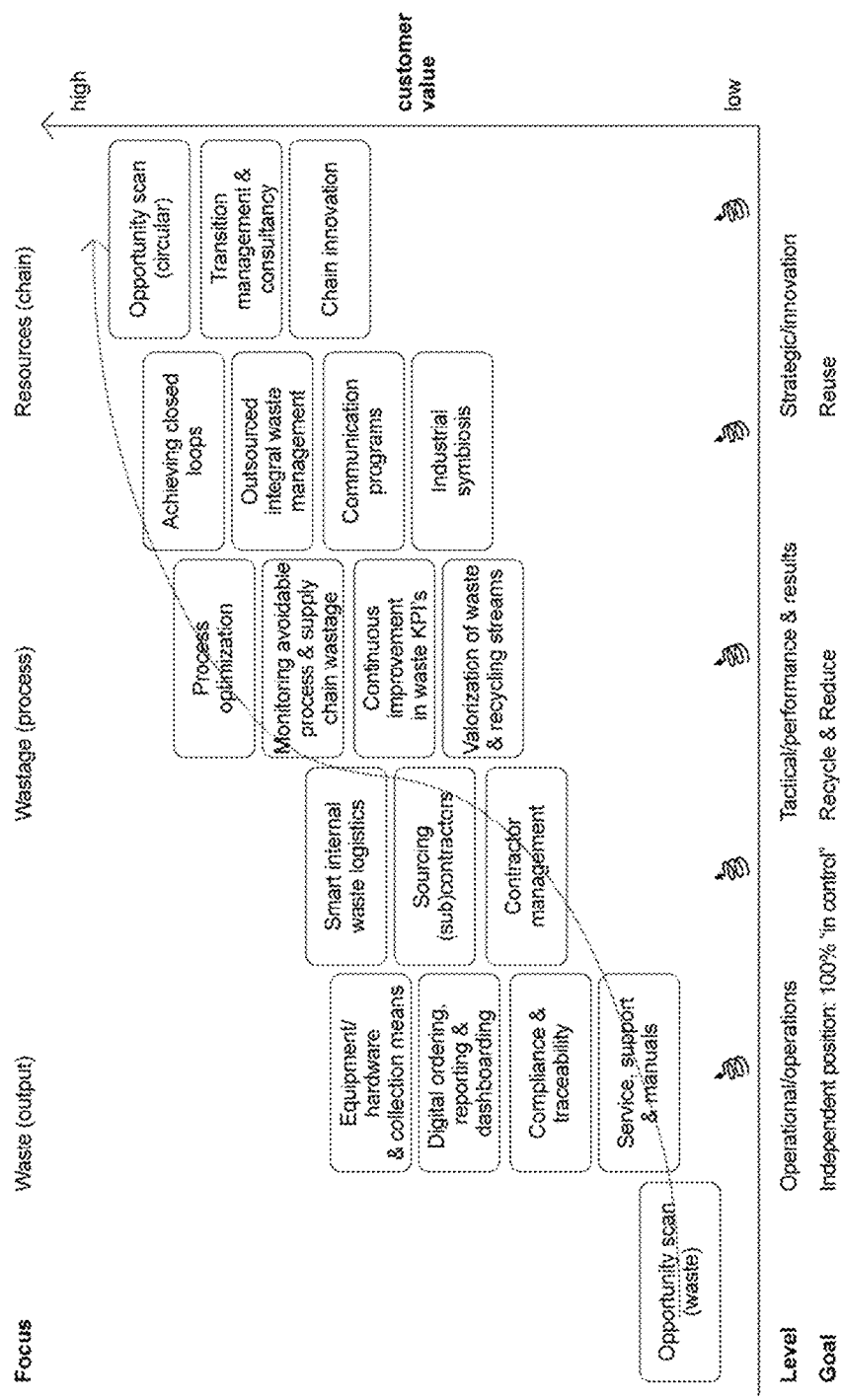
FIG. 2 shows an exemplary method.

FIG. 2 shows an exemplary method. Various phases can be identified. First waste is scanned systematically. Then a first operational scan is performed. Therein equipment for collection of waste, methods of collection, and hardware for collection is provided. Also, schematics of the process are implemented, such as quantifications, waste streams, control, and visualization thereof. It is also checked if the waste streams and management thereof is compliant with government regulations and typical standards applicable to the waste streams and handling thereof. Available data is checked and filtered. To some extent this relates to waste stream handling of the prior art. Then typically a first optimization is performed, such as by improving existing ways of handling waste. As many different customers are typically involved, both on the waste stream input side and at the output stream side, it is a rather complex method to handle. Therefore the applicant typically takes full control, or as much as possible. Such control also involves in managing further partners, such as waste transporters. Then a further optimization is started, such as of processes of waste production and typically a reduction is obtained. Also, various forms of feedback are typically initiated. A part of waste reduction is monitoring and reducing production losses, especially those that can be avoided. Control is established, typically in a closed loop, wherein planning, doing, checking, and acting, form part of such loops. As such a quick and reliable way of reducing waste streams and optimizing recircling is obtained. Also an optimization is performed in terms of value; the waste is directed such that for a given total a maximum output is obtained with minimal losses. For instance, in a food optimization program good products are directed to selling points, a surplus is directed to food processing facilities, and waste is reused otherwise, such as for animals. Further closed loops are organized, such as the one depicted in FIG. 1b. It is preferred that the applicant fully manages and controls waste streams of various customers. Only then further optimization can be achieved, as various streams can be balanced, redirected, etc. A part of the present method relies on communication to and between partners in the chain. If enough waste streams and output streams are established, which is the case, a further optimization in terms of industrial symbiosis can be obtained; certain industrial processes are amended such that waste streams can be used, or much better used, in other, further industrial processes. The present distribution stations are then fully functional in terms of input, flexibility, output, and overall losses. Finally, a control is performed in terms of the method being enough, and hopefully fully, circular. A further optimization is then performed. For instance a different packaging material may be used. By connecting various parties full process chain optimization is achieved, as well as inter-process chain optimization. The value of the waste material has increased significantly, losses are reduced, and reuse is optimized.

Figure 3:
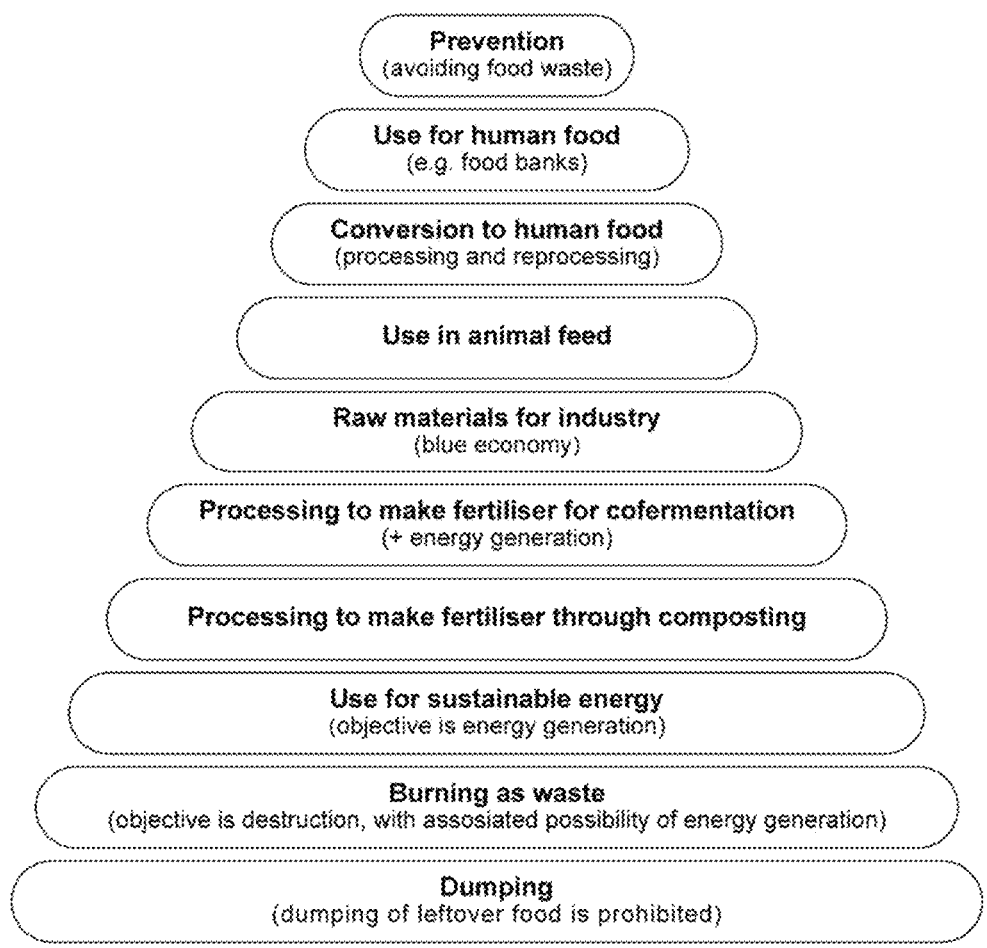
FIG. 3 shows a valorization pyramid.

FIG. 3 is referred to in the description.

Figure 4:
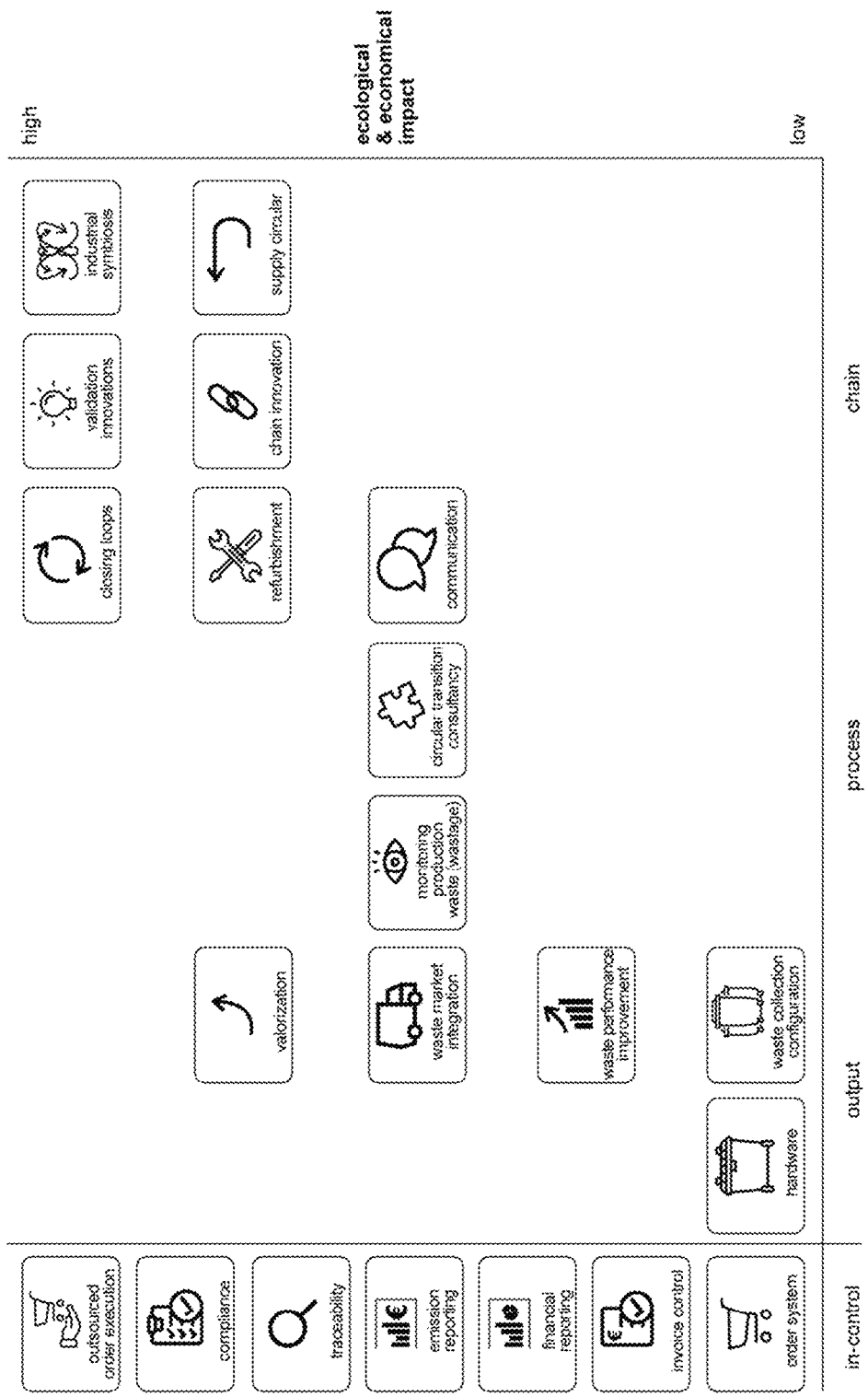
FIG. 4 shows an activity matrix.

FIG. 4 shows an activity matrix. The x-axis represent various focus areas, such as output, process, and chain. The vertical axis shows impact on value. The output may comprise hardware, a waste collection configuration, a waste performance improvement, located higher in the value chain, waste market integration, located even higher in the value chain, and valorization, such as reuse. In the process monitoring, and reduction, of production waste, circular transition, and communication form important aspects. In the chain refurbishment, chain innovation and circular supply are already relatively high in the value chain, whereas closing loops, validating innovations and industrial symbiosis are found to have the largest contribution in the value chain.

The control is visualized by having an order system, controlling invoices, reporting, such as financial reporting, emission reporting, traceability, compliance, and outsource order execution. Strangely enough typically all aspects or most aspects come in the picture, despite expectations being higher in terms of control and valorization.

EXAMPLES

Case Food Producer

This relates to 20 production sites of a globally active dairy manufacturer. It includes approximately 80 different waste streams, for which more than 70 service providers are used for processing.

Situation Before Applying the Present Methodology

The management process of waste/used raw materials is not controlled; no insight, direction and control being present. The waste is considered to be a black box, at a level of individual locations as well as for the collective of all locations. No valid data being available. A linear drainage process is used: the route to processors is one-way traffic, with lock-ins on processing by the service providers. The focus is on "unburdening": 'it has to go'.

Implementation of the Present Milgro Methodology

The collection structure and all collection means are recorded on a digital map. Further every removal action of every waste stream that flows through the company through one of these means and leaves the company is given a unique order. This unique order forms the basis of the waste management of the company. The order is used as the red thread in a digital management process that provides comprehensive administration, financial control, assured data and reporting (costs, volumes, emissions). A full control has been set up for the choice/deployment of specific service providers; therein collection means, logistics, and processing are disconnected from one and another and thus lock-ins are taken away. The digital 'roundabout' for used raw materials that has been set up in this way is dedicated for the company for each waste and waste stream that is released. Sales and processing is guaranteed to the client, without an obligation and fixed link to the processing industry.

In Control

The company has been placed in a flexible position, rather than in a passive position in relation to processing or recycling market and focus on unburdening. The company has management data and is 100% in control and directive. This leads to every improvement measure (focusing on, for example, cost reduction, waste separation, higher quality of secondary streams, higher economic and ecological valorization, reduction of transport movements, reuse) on the one hand can be implemented with a predictable result and, on the other hand, is immediately visible in terms of return for the company. In short, the company is ready for the next phase.

Insight and Control

The Milgro methodology has made the existing black boxes of used raw materials transparent. There is also insight into the composition of the unseparated waste stream. This is now addressed in a targeted manner by optimizing the collection and disposal structure. As a result, >98% of avoidable waste is then separately collected. Subsequently, all means in which avoidable waste is collected are provided with a digital weighing platform. This makes it fully (100%) visible where and when the respective waste stream originated. In the reporting of these data, a projection is also made of the total financial waste that will arise in the future if no measures would have been taken. This is the basis for a case that is focused on the prevention of waste. In other words, the emphasis is no longer on getting the highest possible value (=as low as possible) of the wasted raw materials, but on the occurrence of that waste. In addition to the approach aimed at making the waste transparent, inventors start with up-valorization of the waste streams (both avoidable and unavoidable flows). The aim is to achieve the highest possible value in the valorization pyramid (of Moermans). For example, certain flows are converted from bio-fermentation to animal feed. In this way, the digital raw material roundabout is always provided with new paths, whereby the used raw materials are sent to new, possibly innovative processing methods. This is done in full control and leads to an ecological and an economically better performance (see FIG. 3).

Achieved Results

With the described approach, the following results were achieved: a reduction of direct waste costs by 25% (135,000 euros per year structurally); a reduction of indirect waste costs (costs of internal waste logistics) by 300,000 euros per year; higher net revenues for raw material flows (cardboard, kraft paper, big bags and powders, graft sludge), despite declining raw material values on world markets; a reduction of residual waste with 506,579 kg; an increase of recycling from 81% to 89%; a 65% reduction in # of transport movements; and diversion of various flows to higher value valorization, such as anaerobic sludge is no longer composted but higher quality valorized as a raw material for the start-up of new fermentation plants, and paraffin used in a production process is now reused by the supplier.

Case Retail Organization

This relates to 140 retail locations of a worldwide producer of fuels, among others. There are 29 different waste streams in scope. In the processing structure thereof initially 10 service providers were deployed for executive services, i.e. logistics, handling and processing of waste products.

Situation Before Applying Milgro Methodology

The management process of waste/used raw materials is not controlled; separate locations must manage the execution themselves by controlling the service providers. There is no reliable data about volumes, qualities, costs and emissions, which may be regarded as rather strange. There are no control and control mechanisms. Compliance with regulations and internal reporting requirements can not be established audibly.

As a consequence hereof external QHSE audits at the client were not successful the last two times.

Implementation of the Milgro Methodology

The collection structure and all collection means for waste are recorded in a digital folder. Therein each discharge action of each waste stream that leaves the company through one of these means receives a unique (digital) order. This digital order forms the basis of the waste management of the company. The order is considered the common thread in a digital management process, which provides for comprehensive administration, financial control, assured data and reporting (costs, volumes, emissions). As a result full control has been set up for the choice/deployment of specific service providers.

In Control

With the above implementation real-time insight has been created in the waste output of the organization, based on validable data. A digital audit trail is available for every order. Due to the digital administrative handling of the invoices of the waste service providers (i.e., automated reconciliation of invoices with order data), the financial waste administration is demonstrably correct. The sustainability report has now also been validated. The management of the waste service providers is now centrally and order-controlled from Milgro instead of locally from the individual locations. As a result the separate locations are optimally unburdened.

Also the company has been placed in a flexible position, instead of in a passive position in relation to the processing and recycling market. By decoupling logistics and processing, lock-ins have been removed to existing service providers. The company now has management data and is 100% in control and in the lead.

Insight and Control

By segmenting and benchmarking data from 140 locations, insight is gained into the waste performance per individual retail location and per cluster of locations. This makes it possible to focus on better waste performance. On the basis of the available data, the discharge structure (the combination of the numbers and types of collection means used for specific waste streams, the capacity of those resources and the emptying frequency per resource, is optimally configured. For example, a roll container for residual waste with a capacity of 1000 liters, which is emptied once a week is provided. This new configuration is translated into adjustments in the order system, such that the service providers are properly managed and the waste data are always based on the current situation. With the implemented adjustments, the direct waste costs are reduced, as are the number of logistic (discharge) movements and the accompanying $CO_2$ emissions.

Finally, insight is gained into the actual weights of the disposed residual waste. This makes it possible to base invoices on actual discharge data, instead of an average specific weight. The client therefore no longer pays for discharged 'air'.

From Output to Process and Chain

An in-depth analysis is performed on the waste data, in which a relationship is found between the output (data) and the business processes of the client. The waste streams (used raw materials) are subdivided into four different origins:
1. waste arising from the supply chain;
2. loss of food (sold at the retail premises) by the expiry of the best before date;
3. household waste (from the business operations);
4. consumer waste (from the visitors).

The previously mentioned modifications in the configuration make it possible to make a division in the way in which these released waste materials are removed. The starting point here is that the supply chain flows are brought into a close-loop (back to the supplier), and other waste streams must be carefully processed, or must be reduced, with the aim of minimizing emissions. For the close-loop flows, the logistics 'return journey' with the existing suppliers was then organized. This has put the client in a position to actively steer towards improved recycling, reducing waste flows (reducing) and reusing raw materials (reuse). The focus on reduction (reduce) is given body by providing insight into the financial waste that arises because the client has to discard foods that are close to the expiration date. This makes it possible to purchase in a more targeted way, with significant financial savings and a lower burden on new raw materials as a result.

Reuse is initially made possible for plastic packaging. by the return of used plastics by the supplier. After a processing cycle these can again be used by the supplier as packaging material.

FURTHER EXAMPLES

In an example cars or at least parts thereof are reused. For a given electrical car at least 45 waste streams are identified, such as wheels, rubber, bearings, metal, connectors, wiring, a motor, controls, chips, batteries, etc. At least some of these waste streams, such as batteries, can be reused directly after refurbishing. Others, such as car parts, may need some further processing, such as blasting and repainting, in order to be reused. At least part of the motor can be reused, with new parts therein. Some waste streams can be recircled, such as by converting back into raw material, such as metals, reshaping into new parts, and further processing said new parts. In an initial phase already some 70% of the car can be reused. A further advantage is that by reusing a large fraction of the car, the car and parts thereof are redesigned such that an even larger fraction can be reused.

In a further example waste streams of a large Dutch supermarket are reused and reduced. There are more than 100 waste streams involved, from various forms of packaging material (plastic, paper, cardboard), various forms of packaging, such as plastic containers, bottles which are reused, such as glass and some plastic, bottles that are recycled, over-date products, vegetables that have lost appearance, and so on.

In an example the present method is applied to a large distributor of appliances. The distributor sells and delivers appliances. Upon delivery the appliance is unpacked. The various components of the package are separated on the spot and taken back. In addition old appliances are collected, if applicable, as well as further components. When returning the various components of the package are distributed over collectors. If relevant, such as for foamed plastic and cardboard, the waste material is pressed therewith reducing a volume thereof significantly. The old appliance is decomposed into base materials, such as metals, plastic, etc.

In a further example waste streams of a food manufacturer are reduced. In an initial situation a press container of 20 m$^3$ was emptied once a week; in total some 300 tons of waste was removed. The costs for emptying and the container were some € 65000 per year. In addition a press container for cardboard was used, being emptied about twice per day. About 925 tons were transported at a total cost of about € 32000. By carefully analyzing the process the waste could be reduced by a few percent, the cardboard use was reduced by about 20%. Such was achieved by redesigning the process, which in addition reduced labor by about 3 FTE/year. By emptying only when full the costs were reduced to about € 50000 for the waste and to about € 25000 for the cardboard. The number of transports for the cardboard was reduce to about 30%. As a side catch, by benchmarking, it was found that waste of a compound used, namely paraffin, could be reused almost fully.

In a similar example as above waste was incinerated. By carefully separating, i.e. forming more sub-components, a part could be reused, a part could be digested by microorganisms into methane and granular sludge, which granular sludge is a source for anaerobic reactors, less transportation (−75%) was required, and less labor was involved. A reduction is waste of about 55% was achieved.

In a further example overdue as well as unattractive vegetables were destroyed. By carefully analysing it was established that most of the vegetables were still totally suited for food preparations, such as soup. Therewith the waste stream was upgraded a few levels to a valuable product. In addition, however the applicant had to organize transport and flow of ingredients (vegetables) in order to secure production. About 30 tons of vegetables could be saved from throwing a way, per week. Vegetable inputs form other sources are now also distributed towards food preparations.

In a further example the method is implemented on a computer and preferably wherein control is on the computer.

It should be appreciated that for commercial application it may be preferable to use one or more variations of the present system, which would similar be to the ones disclosed in the present application.

The invention claimed is:

1. A method of recircling a multitude of generic waste streams from a plurality of sources, comprising identifying, determining, and quantifying initial input waste streams and sub-components, wherein waste input streams form a multi-chain and wherein waste input streams form interwoven chains, wherein quantifying involves two or more of time, quantity, quantity/time, emission, energy use, costs, and quality of the waste streams, codifying said input waste streams and sub-components, in taking the multitude of input waste streams, separating separable sub-components of the multitude of generic waste streams from one and another and providing sub-component waste streams, wherein sub-components have a chemical, physical, or biological nature, or a combination thereof, inputting each sub-component waste stream or generic waste stream into at least one distribution station, wherein at least one waste stream enters a distribution station, providing at least one re-use path per distribution station, and selecting at least one re-use path per sub-component waste stream, therewith forming an interwoven chain of waste to product process, transferring the multitude of sub-component waste streams and generic waste streams to a number of re-use paths while controlling two or more of time, quantity, quantity/time, emission, energy use, costs, and quality of the waste streams, and controlling a number of reuse paths, and wherein control involves of at least one re-use path forecasting at least one of time, quantity, quantity/time, emission, energy use, costs, quality, and a number of reuse paths, wherein the multitude of sub-components and waste streams are transferred, to a plurality of re-use paths, generating at least one output stream, each output stream receiving input from at least one re-use path, transferring at least one output stream to a number of product paths while controlling in the multi-chain and interwoven chains at least one of time, quantity, quantity/time, emission, energy use, costs, and quality of the product paths, and controlling in the multi-chain and interwoven chains a number of product paths, and optimizing in the mold chain and interwoven chains recircling continuously in view of changing initial waste streams and sub-components in view of two or more of time, quantity, quantity/time, emission, energy use, costs, and quality of the waste streams, and in view of controlling a number of reuse paths, and optimizing in the multi-chain and interwoven chains recircling in view of changing output streams, and optimizing recircling by providing feedback to at least one producer of generic waste stream in view of one or more of time, quantity, quantity/time, emission, energy use, costs, and quality of the waste stream.

2. The method according to claim 1, wherein at least one re-use path is an end of life path, wherein after in taking a waste stream the waste stream is pre-treated with a primary treatment unit.

3. The method according to claim 1, wherein the multitude of sub-components and waste streams are transferred over a period of at least one year.

4. The method according to claim 1, wherein a quantity is at least 1000 kg, and wherein quantity/time is at least 1000 kg/week.

5. The method according to claim 1, wherein at least one waste stream is reduced in size.

6. The method according to claim 1, wherein the transfer of the quantity and quantity/time of at least one waste stream is optimized by reducing a number of waste stream transfers.

7. The method according to claim 1, wherein at least one waste stream quantity of the multitude of generic waste streams is reduced.

8. The method according to claim 1, wherein at least one waste stream relates to a product, and wherein at least one re-use path provides input to a production of said product.

9. The method according to claim 1, wherein at least one waste stream relates to a product, wherein the quality of the at least one product and package thereof is changed, and wherein the waste stream is redirected to a different re-use path and a different product path, wherein the re-use path is a circular re-use path.

10. The method according to claim 1, wherein at least one re-use path exits said distribution station, and wherein at least one re-use path exiting a first distribution station enters a second distribution station, and wherein at least one waste stream and at least one re-use path, or part thereof, is redirected from a first distribution station to a second distribution station.

11. The method according to claim 1, wherein time, quantity, quantity/time, emission, energy use, costs, quality, and a number of sub-component waste streams are controlled.

12. The method according to claim 1, wherein a quantity and a quantity/time of at one least sub-component waste stream is reduced.

13. The method according to claim 1, wherein a number of sub-component waste streams per product is increased.

14. The method according to claim 1, wherein a number of product paths per output stream is increased.

15. The method according to claim 1, wherein at least one of quantity and quality of at least one sub-component waste stream is changed.

16. The method according to claim 1, wherein control involves of at least one product path forecasting at least one of time, quantity, quantity/time, emission, energy use, costs, quality, and a number of product paths.

17. The method according to claim 1, wherein at least one sub-component waste stream is treated such that it "is as good as new".

18. The method according to claim 1, wherein at least one of a waste collection configuration, waste collection, waste performance, waste market integration, valorization of waste, production waste, circular transition, refurbishment, communication, return paths, chain innovation, supply, industrial symbiosis, an order system, emission, traceability, compliance, and execution, is improved and controlled.

19. The method according to claim 1, wherein the method is implemented on a computer and wherein control is on the computer.

20. A non-transitory computer program product comprising instructions which, when the program is executed by a computer, cause the computer to carry out the following instructions:

identifying, determining, and quantifying initial input waste streams and sub-components, wherein waste input streams form a multi-chain and wherein waste input streams form interwoven chains, wherein quantifying involves two or more of time, quantity, quantity/time, emission, energy use, costs, and quality of the waste streams, codifying said input waste streams and sub-components, in taking the multitude of input waste streams, separating separable sub-components of the multitude of generic waste streams from one and another and providing sub-component waste streams, wherein sub-components have a chemical, physical, or biological nature, or a combination thereof, inputting each sub-component waste stream or generic waste stream into at least one distribution station, providing at least one re-use path per distribution station, wherein the re-use path optionally is an end of life path, and selecting at least one re-use path per sub-component waste stream, therewith forming an interwoven chain of waste to product process, transferring the multitude of sub-component waste streams and generic waste streams to a number of re-use paths while controlling two or more of time, quantity, quantity/time, emission, energy use, costs, and quality of the waste streams, and controlling a number of reuse paths, generating at least one output stream, each output stream receiving input from at least one re-use path, and transferring at least one output stream to a number of product paths while controlling in the multi-chain and interwoven chains at least one of time, quantity, quantity/time, emission, energy use, costs, and quality of the product paths, and controlling in the multi-chain and interwoven chains a number of product paths, recircling a multitude of generic waste streams from a plurality of sources, and optimizing in the multi-chain and interwoven chains recircling continuously in view of changing initial waste streams and sub-components in view of two or more of time, quantity, quantity/time, emission, energy use, costs, and quality of the waste streams, and in view of controlling a number of reuse paths, and optimizing recircling in view of changing output streams, and optimizing in the multi-chain and interwoven chains recircling by providing feedback to at least one producer of generic waste stream in view of one or more of time, quantity, quantity/time, emission, energy use, costs, and quality of the waste stream.

* * * * *